US012090487B2

(12) United States Patent
Obermeyer

(10) Patent No.: US 12,090,487 B2
(45) Date of Patent: Sep. 17, 2024

(54) GRINDING MECHANISM FOR FOOD WASTE DISPOSER

(71) Applicant: INSINKERATOR, LLC, Benton Harbor, MI (US)

(72) Inventor: Eric J. Obermeyer, Franklin, WI (US)

(73) Assignee: INSINKERATOR LLC, Benton Harbor, MI (US)

(*) Notice: Subject to any disclaimer, the term of this patent is extended or adjusted under 35 U.S.C. 154(b) by 58 days.

(21) Appl. No.: 17/854,864

(22) Filed: Jun. 30, 2022

(65) Prior Publication Data

US 2023/0001421 A1 Jan. 5, 2023

Related U.S. Application Data

(60) Provisional application No. 63/217,966, filed on Jul. 2, 2021.

(51) Int. Cl.
*B02C 18/00* (2006.01)
*B02C 23/36* (2006.01)
*E03C 1/266* (2006.01)

(52) U.S. Cl.
CPC .......... *B02C 18/0092* (2013.01); *B02C 23/36* (2013.01); *E03C 1/2665* (2013.01); *B02C 2201/063* (2013.01)

(58) Field of Classification Search
CPC ............ B02C 18/0084; B02C 18/0092; B02C 18/062; E03C 1/266; E03C 1/2665
See application file for complete search history.

(56) References Cited

U.S. PATENT DOCUMENTS 2,565,322 A 8/1951 Powers
2,822,988 A 2/1958 Hammes
2,836,369 A 5/1958 Strehlow et al.
3,026,050 A * 3/1962 Bebinger .............. E03C 1/2665 241/293
3,076,611 A 2/1963 Jordan
3,194,505 A 7/1965 Spackman
(Continued)

FOREIGN PATENT DOCUMENTS

AU 2008100504 5/2005
AU 2008100497 5/2008
(Continued)

OTHER PUBLICATIONS

FANUC, "Robotic Pick and Place at 182 Parts/minute—FANUC's M-2iA Delta Robot Picks Breather Caps," YouTube (Jul. 25, 2014) https://www.youtube.com/watch?v=DJt2tGszp6U, 3 pages.
(Continued)

*Primary Examiner* — Faye Francis
(74) *Attorney, Agent, or Firm* — Amundsen Davis, LLC

(57) ABSTRACT

Grinding sections for food waste disposers, food waste disposers having grinding sections, and methods of manufacturing food waste disposers having grinding sections are disclosed herein. The grinding sections include an internal wall having a plurality of projections extending into the food receiving area. Grinding inserts are attached to each projection. The grinding sections may be made by molding the grinding section housing with the projections and attaching the grinding inserts into the projections.

15 Claims, 5 Drawing Sheets

(56) References Cited

U.S. PATENT DOCUMENTS

| | | | | |
|---|---|---|---|---|
| 3,823,880 | A * | 7/1974 | Urschel | B02C 18/062 366/264 |
| 3,888,426 | A * | 6/1975 | Urschel | B02C 18/086 241/5 |
| 4,610,397 | A * | 9/1986 | Fischer | B02C 18/062 241/257.1 |
| 4,660,778 | A * | 4/1987 | Fischer | B02C 18/062 241/296 |
| D547,113 | S | 7/2007 | Pan et al. | |
| D560,962 | S | 2/2008 | Pan et al. | |
| 7,607,599 | B2 | 10/2009 | Jara-Almonte et al. | |
| 7,753,297 | B2 | 7/2010 | Hanson et al. | |
| 7,866,583 | B2 * | 1/2011 | Jara-Almonte | E03C 1/2665 241/DIG. 38 |
| 7,963,469 | B2 | 6/2011 | Hanson | |
| 8,087,600 | B2 | 1/2012 | Pan et al. | |
| 8,146,843 | B2 * | 4/2012 | Ye | E03C 1/2665 241/46.013 |
| 8,500,050 | B2 | 8/2013 | Ryder | |
| 2007/0075169 | A1 * | 4/2007 | Pan | E03C 1/2665 241/46.013 |
| 2012/0234951 | A1 | 9/2012 | Ryder | |
| 2016/0002900 | A1 | 1/2016 | Gormley et al. | |

FOREIGN PATENT DOCUMENTS

| | | | |
|---|---|---|---|
| CN | 112892843 | A | 6/2021 |
| CN | 112900560 | A | 6/2021 |

OTHER PUBLICATIONS

Delonghi, "Waste Disposal," brochure (2009) 5 pages.

International Search Report and Written Opinion from WIPO dated Jan. 3, 2023 for International Application No. PCT/US2022/035748 (13 pages).

International Preliminary Report on Patentability and Written Opinion from WIPO dated Dec. 14, 2023 for International Application No. PCT/US2022/035748 (7 pages).

* cited by examiner

GRINDING MECHANISM FOR FOOD WASTE DISPOSER

FIELD OF THE INVENTION

The present technology relates to food waste disposers, and more particularly, to grinding mechanisms for food waste disposers.

BACKGROUND

Food waste disposers are used to comminute food scraps into particles small enough to safely pass through household drain plumbing. Referring to FIG. 1 (Prior Art), a conventional food waste disposer 10 is often mounted to a sink, such as a kitchen sink (not shown), and includes a food conveying section 12, a motor section 14, and a grinding section 16 disposed between the food conveying section and the motor section. The food waste disposer 10 includes a housing 18 that contains the food conveying section 12, the motor section 14, and the grinding section 16. The food conveying section 12 includes an inlet 20 for receiving food waste and water. The food conveying section 12 conveys the food waste to the grinding section 16, and the motor section 14 includes a motor imparting rotational movement to a shaft to operate the grinding section.

The grinding section 16 includes a grinding mechanism that accomplishes the comminution and is typically composed of a rotating shredder plate and a stationary grind ring.

Referring to FIG. 2 (prior Art), one example of a known grinding section 16 is shown. The illustrated grinding mechanism 22 includes a grinding plate 24 with swivel lugs 26 and 38 and a stationary grind ring 28. The grinding plate 24 is mounted to the shaft 30. The stationary grind ring 28, which includes a plurality of notches 32 defining spaced teeth 34, is fixedly attached to an internal wall 44 of a housing 36. In the operation of a food waste disposer having the grinding mechanism shown in FIG. 2, the food waste delivered by the food conveying section to the grinding mechanism 22 is forced by the swivel lugs 26 and 38 against the teeth 34 of the stationary grind ring 28. The edges of the teeth 34 grind the food waste into particulate matter sufficiently small to pass from above the grinding plate 24 to below the grinding plate 24 via gaps between the rotating and stationary members. Due to gravity, the particulate matter that passes through the gaps between the teeth 34 drops onto the upper end frame 40 and, along with water injected into the disposer, is discharged through a discharge outlet 42. Size control is primarily achieved through controlling the size of the gap through which the food particles must pass.

Current household food waste disposers tend to have a grinding section that is fabricated as a molded part, and a circumferential grinding ring which is separately formed and mechanically inserted into the molded part at its inside diameter. The grinding ring is usually made of steel, and the portions of the steel ring which are not actively used in the grinding process represent potential material waste, especially to the extent they are not strictly necessary for the grinding process and are instead used to join the actual grinding features together in a connective capacity that is redundant within the overall structure of the disposer. Production of the grind ring as a single part (or a small number of relatively large, curved parts), also requires a separate material fabrication operation. The assembly of such a grind ring into the grind chamber or enclosure also requires an additional operation, with its corresponding capital, labor, and material-handling costs. Finally, the tooling costs and lead-times associated with a stationary grind ring can present barriers to quickly implementing meaningful and incrementally-adjustable changes in performance, through the variation (e.g. of the number and type) of the grind-engaging features, and the parallel usage of multiple such variant ring designs adds inventory cost.

SUMMARY OF THE INVENTION

Food waste disposers, grinding sections for food waste disposers, and method of manufacturing grinding sections for food waste disposers are disclosed herein.

In accordance with at least one aspect a food waste disposer is provided that includes a grinding section having a grinding section housing that has an internal wall that defines a food receiving area. The food waste disposer also includes a plurality of projections formed in the internal wall into the food receiving area. The food waste disposer further includes a plurality of grinding inserts. Each grinding insert is attached to one of the projections.

In accordance with a second aspect, a grinding section for a food waste disposer is provided that includes a grinding section housing having an internal wall that defines a food receiving area. The grinding section also includes a plurality of projections formed in the internal wall into the food receiving area. The grinding section further includes a plurality of grinding inserts. Each grinding insert is attached to one of the projections.

In accordance with a third aspect, a method of manufacturing a grinding section for a food waste disposer is provided. The method includes a step of molding a grinding section housing internal wall that defines a food receiving area and a plurality of projections formed in the internal wall into the food receiving area. The method also includes providing a plurality of grinding inserts, and attaching each of the plurality of grinding inserts to one of the projections.

BRIEF DESCRIPTION OF THE DRAWINGS

Specific example embodiments have been chosen for purposes of illustration and description, and are shown in the accompanying drawings, forming a part of the specification. The example embodiments and related components and methods encompassed herein are not limited in their applications to the details of construction, arrangements of components, or other aspects or features illustrated in the drawings. Like reference numerals are used to indicate like components.

DETAILED DESCRIPTION

Food waste disposers of the present technology may be configured to be installed under a sink, such as in a home or other desired location.

Figure 1:
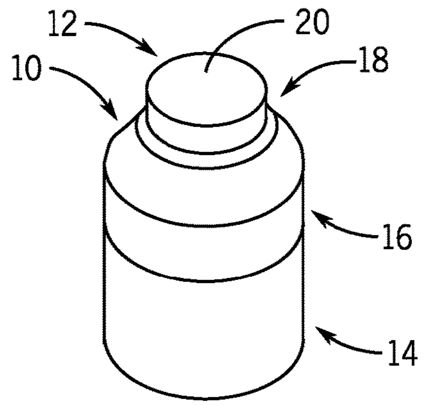
FIG. 1 (PRIOR ART)
FIG. 1 is an external view of one example of a prior art food waste disposer.
Figure 2:
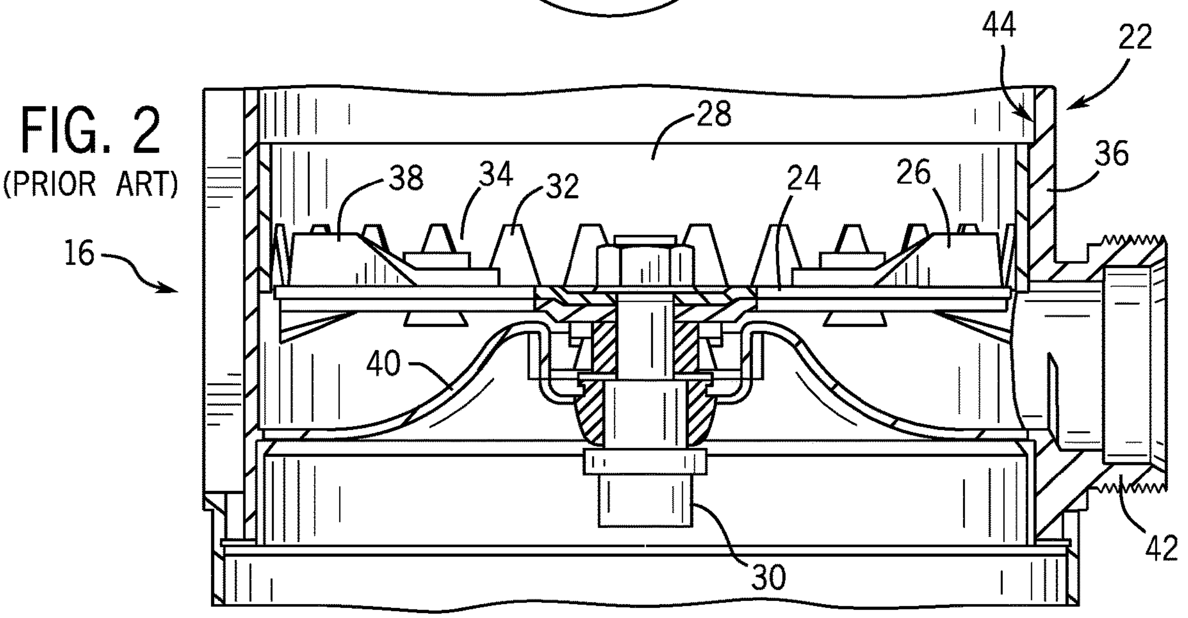
FIG. 2 (PRIOR ART)
FIG. 2 is a cross-sectional view of a grinding section of the prior art food waste disposer of FIG. 1.

Food waste disposers of the present technology may have a food conveying section 12, a motor section 14, and a grinding section 16 disposed between the food conveying section and the motor section as shown in FIG. 1 with respect to food waste disposer 10. Food waste disposers of the present technology may also have a rotating grinding plate, which may be the same as, similar to, or different from the rotating grinding plate 24.

Generally, food waste disposers of the present technology have a grinding section that includes a grinding section housing. The grinding section housing has an internal wall that defines a food receiving area. A plurality of projections formed in the internal wall, which may be integrally formed in the internal wall, and face into the food receiving chamber. The grinding section also includes a plurality of grinding inserts, wherein each grinding insert is attached to one of the projections. In at least some examples, grinding sections of the present technology can be fabricated as a molded part including the internal wall and the projections.

Food waste disposers of the present technology do not have a conventional stationary grinding ring that is separately fabricated and then inserted into the grinding section housing. Instead, food waste disposers of the present technology may be fabricated by attaching grinding inserts to the projections during the molding operation. This may eliminate the need for connective material to form a complete ring, or ring segments, thereby saving the portion of that material which is redundant to the requirements of the disposer structure. It may also eliminate the need for a post-molding assembly operation for the insertion of a stationary grinding ring into the enclosure that forms the grinding section. The use of projections and grinding inserts may also simplify the introduction of incrementally-adjustable changes in grinding performance by permitting such changes to be a function of the introduction of grinding inserts (e.g. changes in number and/or type), in lieu of dedicated tooling to form each ring configuration. The use of grinding inserts may also allow multiple variants to be produced using each insert type, which may permit differentiation with regard to the grinding-feature system at lower inventory cost than if each such system were implemented with a different grinding ring.

FIGS. 3-6 illustrate one example of a portion of a food waste disposer 100 that has a grinding section 102. The grinding section 102 includes a grinding section housing 104 that defines a food receiving area 106. The grinding section housing has an external wall 108 and an internal wall 110. The internal wall 110 forms an outer boundary of the food receiving area 106. The grinding section 102 may also include a rotating grinding plate 112.

Figure 3:
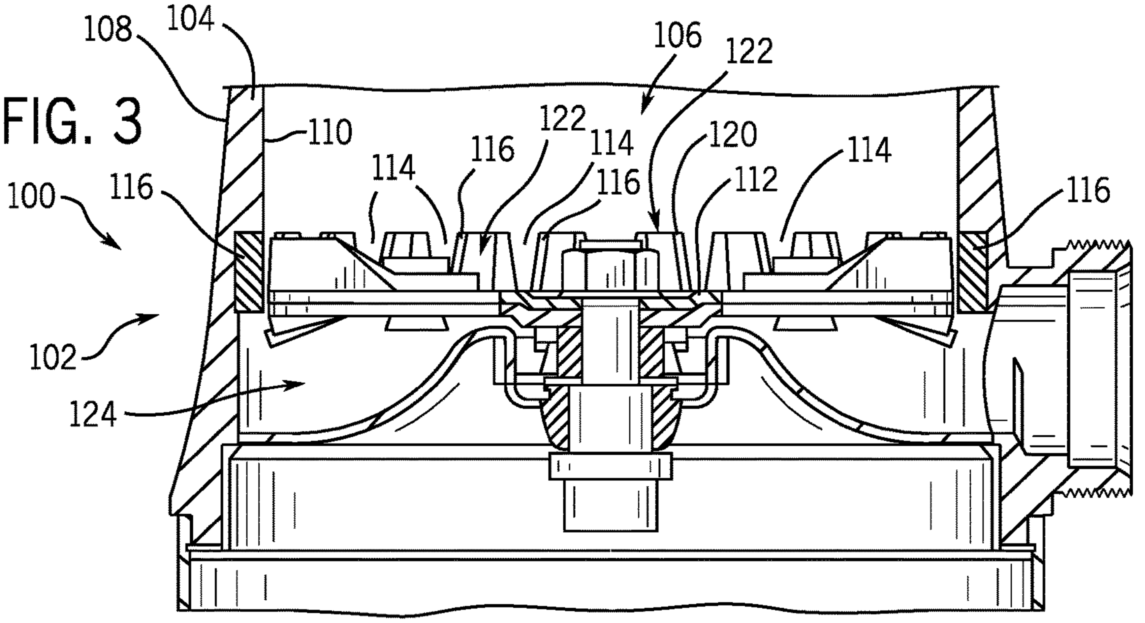
FIG. 3 is a cross-sectional view of a grinding section of a food waste disposer of the present technology.
Figure 4:
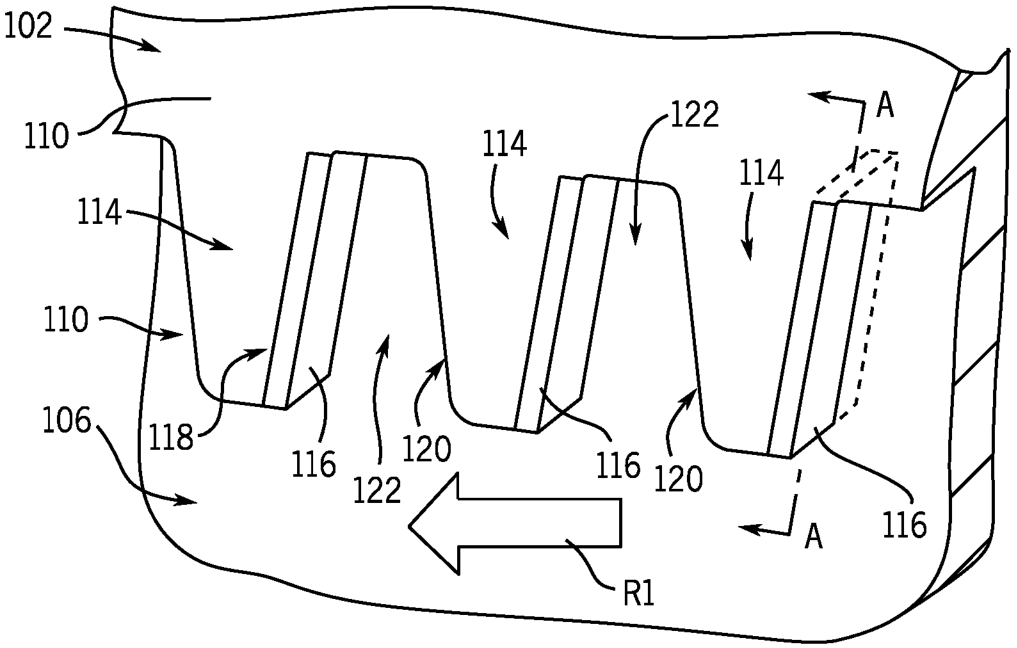
FIG. 4 is a view of a portion of a first example of a grinding section of a food waste disposer of the present technology having an internal wall that includes projections and grinding inserts.
Figure 5:
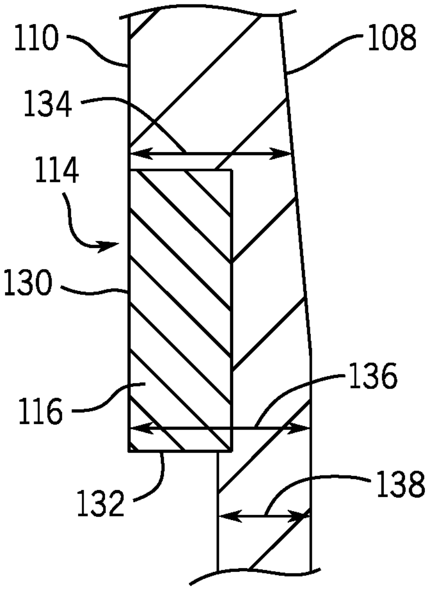
FIG. 5 is a first section view of Section A-A of FIG. 1, showing a grinding insert attached to a projection.
Figure 6:
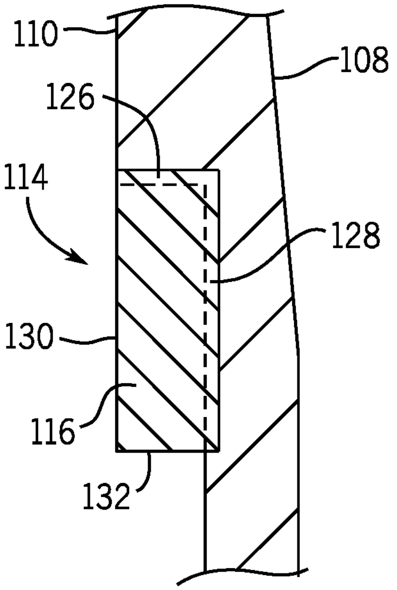
FIG. 6 is a second section view of Section A-A of FIG. 1, showing a margin by which the grinding insert is inserted into the projection.

FIGS. 4-6 illustrate a portion of the grinding section 102 of the food waste disposer 100 shown in FIG. 3, which includes a portion of the internal wall 110 and a cross-section along line A-A thereof. In this example, the rotating grinding plate 112 (FIG. 3) rotates in the direction shown by arrow R1. The internal wall 110 forms the outer boundary of the food receiving area 106. The internal wall 110 has a plurality of projections 114 that are each formed in the internal wall 110. Each of the projections may be made of the same material as the rest of the internal wall 110, such as plastic. The grinding section 102 also includes a plurality of grinding inserts 116. Each grinding insert 116 is attached to one of the projections 114.

As shown, the projections 114 collectively form a series of teeth. The internal wall 110 may form a circle, the circumference of which may define and enclose the food receiving area 106. The projections 114 may be formed in the internal wall in a repeating pattern, such as at spaced intervals, around the circumference of the internal wall 110. As best shown in FIG. 5, the projections 114 may be formed by varying the thickness of the grinding section housing 104, such that the grinding section housing has a first thickness 134 above each projection 114, a second thickness 136 at each projection, and a third thickness 138 below each projection. The second thickness 136, which forms the projection 114, is wider than the first thickness 134. Then, the inner wall 110 may include at least one horizontal step above the third thickness 138, such that the third thickness is less than the second thickness and may be less than the first thickness. The outer wall 108 may be sloped, angled or curved to provide the expansion of the thickness from the first thickness to the second thickness, while the internal wall 110 may remain vertical, substantially vertical, or may also be sloped, angled or curved.

Each of the projections 114 may be in the form of a tooth formed in the internal wall 110, facing into the food receiving area 106, and each projection 114 may be molded vertically, essentially vertically, curved, sloped, or biased at an angle. With respect to the direction of rotation R1, each projection 114 has a first edge 118, which is a leading edge, and a second edge 120, which is a trailing edge. Between the leading and trailing edges, the grinding section 102 includes notches 122 formed in the internal wall 110. The notches 122 form channels into which food particles may enter and fall downwardly into the food conveying section 124 (FIG. 3).

In the example shown in FIGS. 3-6, each grinding insert 116 is attached to the first edge 118 of one of the projections 114. Each grinding insert 116 may be flat, and may be any suitable shape, including without limitation being rectangular or substantially rectangular. Each grinding insert 116 may be made of any suitable metal or composite material, including without limitation steel. Each grinding insert 116 may be individually formed by being stamped, or by any other suitable forming technique. The grinding inserts 116 may be robotically placed from a feeding mechanism, and may be attached to the projections by being insert-molded. Each of the grinding inserts 116 may be attached to the projections in any suitable manner, and may be oriented vertically or biased at an angle.

As shown in FIG. 6, attachment of a grinding insert 116 may be accomplished by inserting at least a portion of the grinding insert 116 into the projection 114, so that at least a portion of the material of the projection 114 overlaps at least a portion of the grinding insert 116. As shown in FIG. 6, the projection 114 overlaps a top edge portion 126 and first side edge portion 128 of the grinding insert 116. In some examples, each projection may be formed with an engagement feature, such as a slot or hole, configured to receive a grinding insert 116 and secure the grinding insert 116 to the projection 114.

Each grinding insert 116 has a second side edge that is an external side edge 130 and a bottom edge 132. In some examples, one of the external side edge 130 or the bottom edge 132 may protrude beyond the projection 114 into the food receiving area 106. In other examples, both the external side edge 130 and the bottom edge 132 may protrude beyond the projection 114 into the food receiving area 106.

Figure 7:
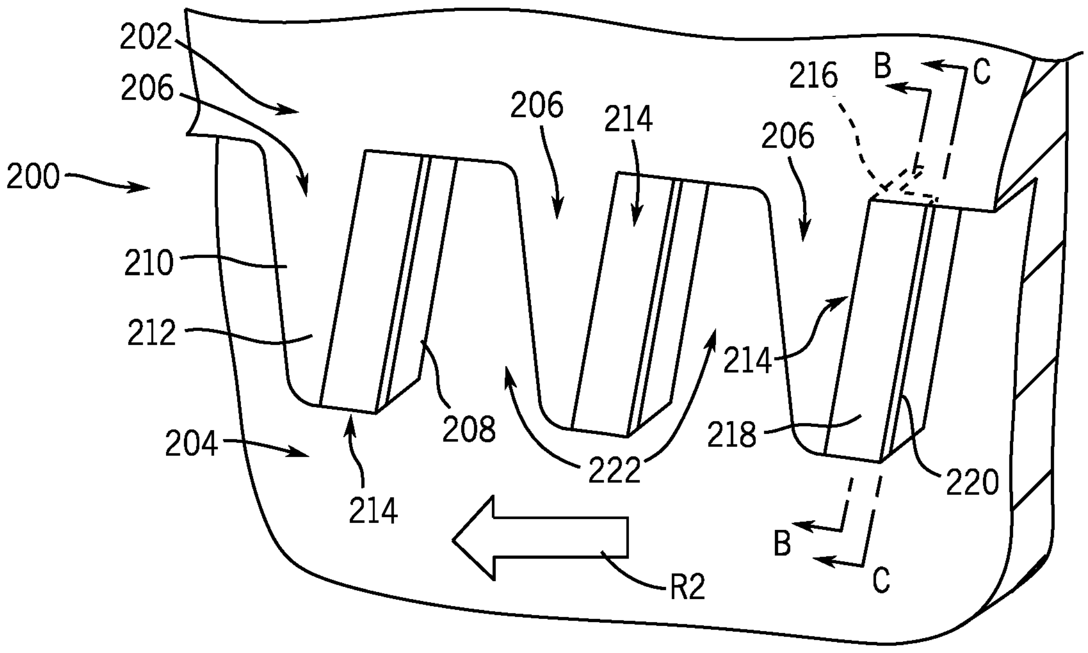
FIG. 7 is a view of a portion of a second example of a grinding section of a food waste disposer of the present technology having an internal wall that includes projections and grinding inserts.
Figure 8:
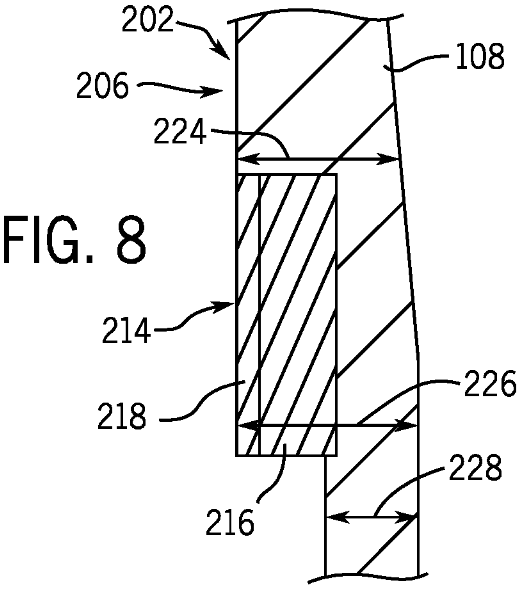
FIG. 8 is a first section view of Section B-B of FIG. 6, showing a grinding insert attached to a projection.
Figure 9:
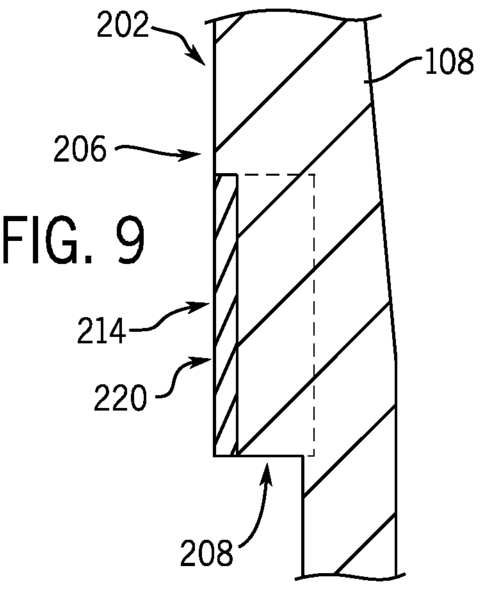
FIG. 9 is a second section view of Section C-C of FIG. 6, showing a grinding insert attached to a projection.

FIGS. 7-9 illustrate a portion of a second example of a grinding section 200 of the present technology, which includes a portion of internal wall 202. FIG. 8 shows a cross-sectional view taken along line B-B of FIG. 7, and FIG. 9 shows a cross-sectional view taken along line C-C of FIG. 7. Grinding section 200 can be used as grinding section 102 in food waste disposer 100. In this example, the rotating grinding plate 112 (FIG. 3) rotates in the direction shown by arrow R2. The internal wall 202 of grinding section 200 defines a food receiving area 204. The internal wall 202 has a plurality of projections 206 that are each formed in the internal wall 202 and face into the food receiving area 204. Each of the projections may be made of the same material as the rest of the internal wall 202, such as plastic.

As shown, the projections 206 collectively form a series of teeth. The internal wall 202 may form a circle, the circumference of which may define and enclose the food receiving area 204. The projections 206 may be formed in a repeating pattern, such as at spaced intervals, around the circumference of the internal wall. As best shown in FIG. 8, the projections 206 may be formed by varying the thickness of the grinding section housing to form the projections in the same manner as described above with respect to FIG. 5, such that the grinding section housing has a first thickness 224 above each projection 206, a second thickness 226 at each projection, and a third thickness 228 below each projection. The second thickness 226, which forms the projection 206, is wider than the first thickness 224. Then, the inner wall 202 may include at least one horizontal step above the third thickness 228, such that the third thickness 228 is less than the second thickness 226 and may be less than the first thickness 224. The outer wall 108 may be sloped, angled or curved to provide the expansion of the thickness from the first thickness to the second thickness, while the internal wall 202 may remain vertical, substantially vertical, or may also be sloped, angled or curved.

Each of the projections 206 may be in the form of a tooth formed in the internal wall 202, facing into the food receiving area 204, and each projection 206 may be molded vertically, essentially vertically, curved, sloped, or biased at an angle. With respect to the direction of rotation R2, each projection 206 has a first edge 208, which is a leading edge, and a second edge 210, which is a trailing edge. Each projection 206 also has a front edge 212, which faces into the food receiving area 204. The grinding section 200 also includes notches 222 formed in the internal wall 202 between the projections 206. The notches 222 form channels into which food particles may enter and fall downwardly into the food conveying section 124 (FIG. 3).

The grinding section 200 also includes a plurality of grinding inserts 214. Each grinding insert 214 is attached to one of the projections 206. Each grinding insert 214 may be made of any suitable metal or composite material, including without limitation steel. Each grinding insert 214 may be individually formed by being stamped, or by any other suitable forming technique. The grinding inserts 214 may be robotically placed from a feeding mechanism, and may be attached to the projections by being insert-molded. Each of the grinding inserts 214 may be attached to the projections in any suitable manner, and may be oriented vertically or biased at an angle.

In the example shown in FIGS. 7-9, each grinding insert 214 is generally L-shaped, having a first leg 216 and a second leg 218. The first leg 216 and second leg 218 may form an angle of about 90°, or any other suitable angle, which may be greater than or less than about 90°. Each grinding insert 214 may be inserted into the projection such that the projection overlaps at least a portion of the grinding insert 214. Specifically, in this example, the first leg 216 may be configured to be radially-oriented and be inserted into the projection 206 such that it is substantially encompassed by and secured within the projection 206. In some examples, each projection 206 may be formed with an engagement feature, such as a slot or hole, configured to receive at least a portion of the first leg 216 and secure the grinding insert 214 to the projection 206.

The second leg 218 of the grinding insert 214 may be configured to abut or engage with the front edge 212 of a projection 206. The projection 206 may have an indent or slot to receive the second leg 218. The second leg 218 has an outer edge 220 that is be configured to abut at least a portion of the first edge 208 of the projection 206. The outer edge 220 may be flush with the front edge 212 and/or the first edge 208 of the projection 206, or may protrude radial inwardly beyond the projection 206 into the food receiving are 204.

Figure 10:
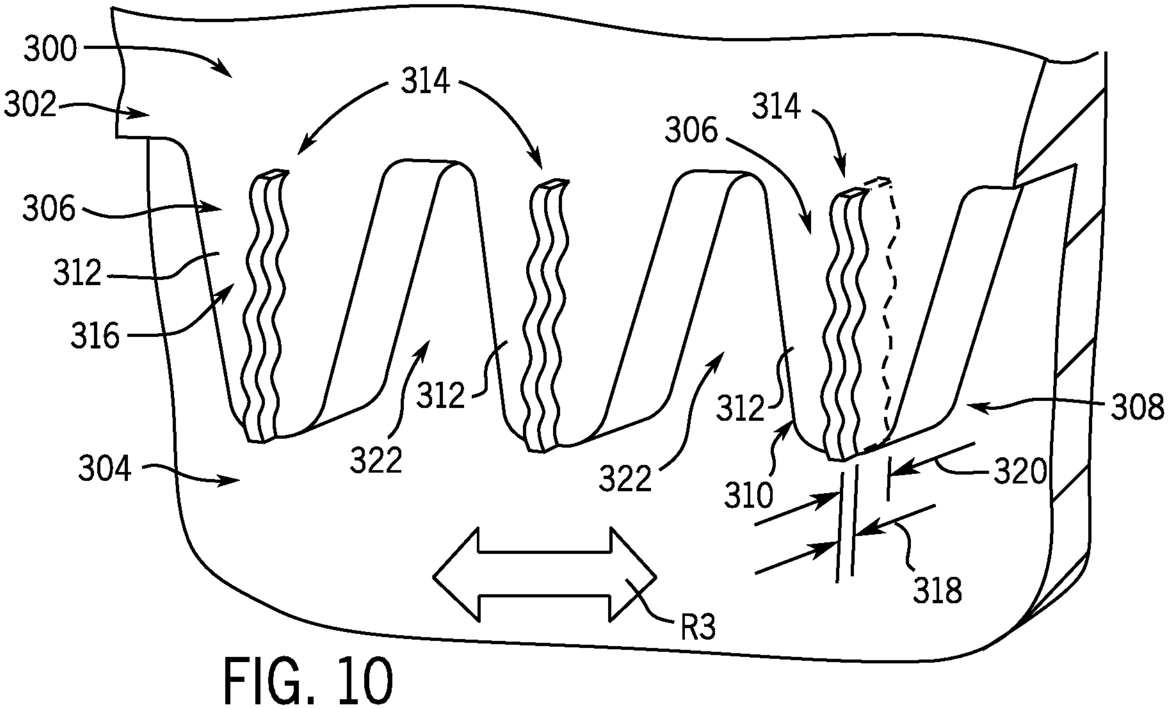
FIG. 10 is a view of a portion of a third example of a grinding section of a food waste disposer of the present technology having an internal wall that includes projections and grinding inserts.
Figure 11:
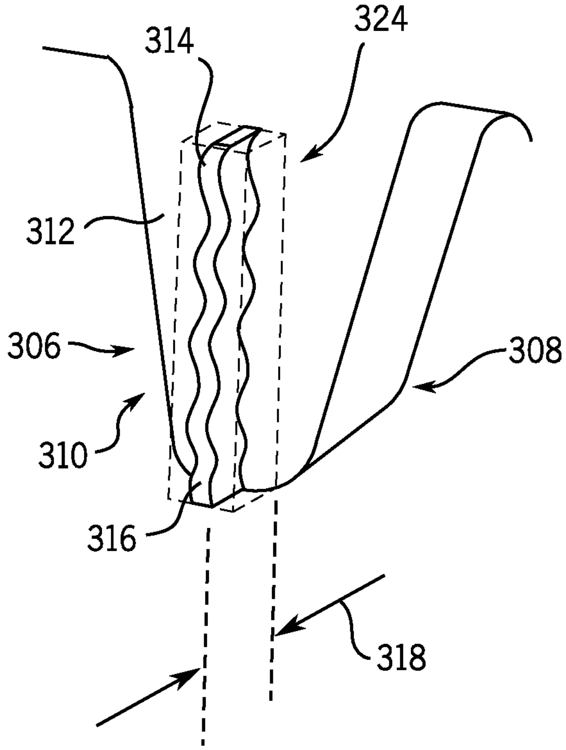
FIG. 11 is a view of a portion of one of the projections of FIG. 9, with a sacrificial layer of material over the grinding insert.

FIGS. 10-11 illustrate a portion of a third example of a grinding section 300 of the present technology, which includes a portion of internal wall 302. Grinding section 300 can be used as grinding section 102 in food waste disposer 100. In this example, the rotating grinding plate 112 (FIG. 3) may rotate in either direction shown by arrow R3, and may be changeable or alternate between the directions of rotation. The grinding section 300 has an internal wall 302 that defines a food receiving area 304. The internal wall 302 has a plurality of projections 306 that are each formed in the internal wall 302 and face into the food receiving area 304. Each of the projections may be made of the same material as the rest of the internal wall 302, such as plastic.

As shown, the projections 306 collectively form a series of teeth. The internal wall 302 may form a circle, the circumference of which may define and enclose the food receiving area 304. The projections 306 may be formed in a repeating pattern, such as at spaced intervals, around the circumference of the internal wall. The projections 306 may be formed by varying the thickness of the grinding section housing to form the projections in the same manner as described above with respect to FIG. 5.

Each of the projections 306 may be in the form of a tooth formed in the internal wall 302, facing into the food receiving area 304, and each projection 306 may be molded vertically, essentially vertically, curved, sloped, or biased at an angle. With respect to the direction of rotation R3, each projection 306 has a first edge 308 and a second edge 310, each of which may be a leading or trailing edge depending upon the direction of rotation R3. Each projection 306 also has a front edge 312, which faces into the food receiving area 304. The grinding section 300 also includes notches 322 formed in the internal wall 302 between the projections 306. The notches 322 form channels into which food particles may enter and fall downwardly into the food conveying section 124 (FIG. 3).

The grinding section 300 also includes a plurality of grinding inserts 314. Each grinding insert 314 is attached to one of the projections 306. Each grinding insert 314 may be made of any suitable metal or composite material, including without limitation steel. Each grinding insert 314 may be individually formed by being stamped, or by any other suitable forming technique. The grinding inserts 314 may be robotically placed from a feeding mechanism, and may be attached to the projections by being insert-molded. Each of the grinding inserts 314 may be attached to the projections in any suitable manner, and may be oriented vertically or biased at an angle.

In the example shown in FIGS. 10-11, each grinding insert 314 is corrugated, having a plurality of grooves or ridges formed therein. The corrugations may allow for improved bending strength of the grinding insert 314, which may allow the use of thinner material. The corrugations may also provide channels for the material of the projections 306 to fill, which may facilitate securing the grinding insert 314 within the projection 306.

Each grinding insert 314 may be inserted into the projection such that the projection overlaps at least a portion of the grinding insert 314. Specifically, in this example, the grinding insert 314 may be rectangular or substantially rectangular and may be configured to be radially-oriented and be inserted into the projection 306 such that at least a portion of the grinding insert 314 is encompassed by and secured within the projection 306. In some examples, each projection 306 may be formed with an engagement feature, such as a slot or hole, configured to receive at least a portion of the grinding insert 314 to the projection 306.

Each grinding insert 314 may have an outer edge 316 that may be configured to protrude radially inwardly from the front edge 312 of the projection 306, into the food receiving area 304, by a protrusion length 318. The protrusion length 318 may be any suitable length, and may correspond to the thickness of a standard stationary grinding ring. In at least one example, the protrusion length 318 may be about 0.075 inches. In an alternative example, the outer edge 316 of the grinding insert 314 may be configured to be flush with the front edge 312 of the protrusion 306. Additionally, as shown in FIG. 11, the manufacturing process may result in a sacrificial layer 324 of the material used to form the protrusion, such as plastic, covering the outer edge 316 of the grinding insert 314. That sacrificial layer may be present prior to use of the grinding section 300, but may wear off during use.

Figure 12:
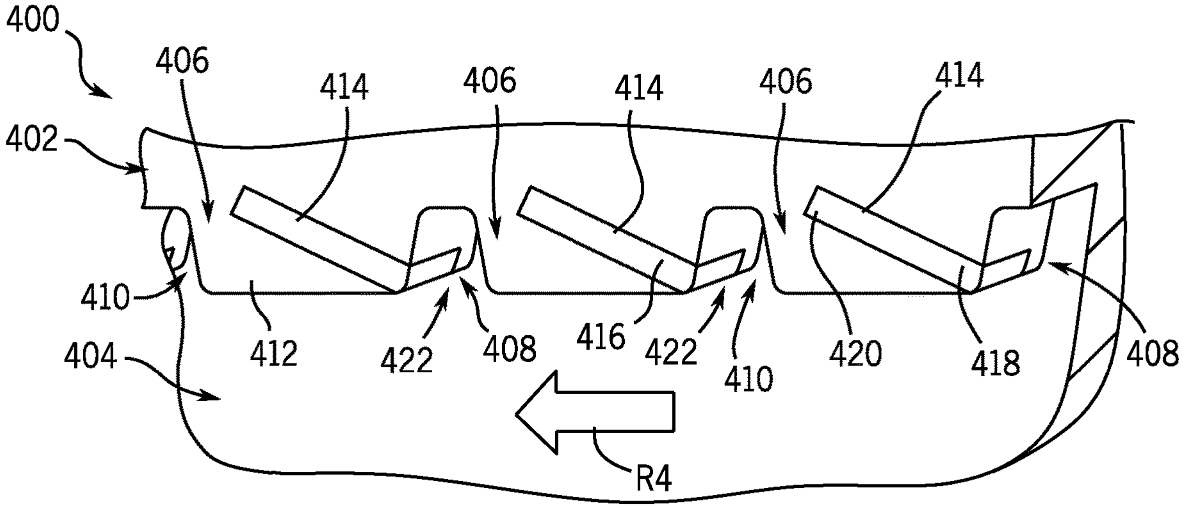
FIG. 12 is a view of a portion of a fourth example of a grinding section of a food waste disposer of the present technology having an internal wall that includes projections and grinding inserts.
Figure 13:
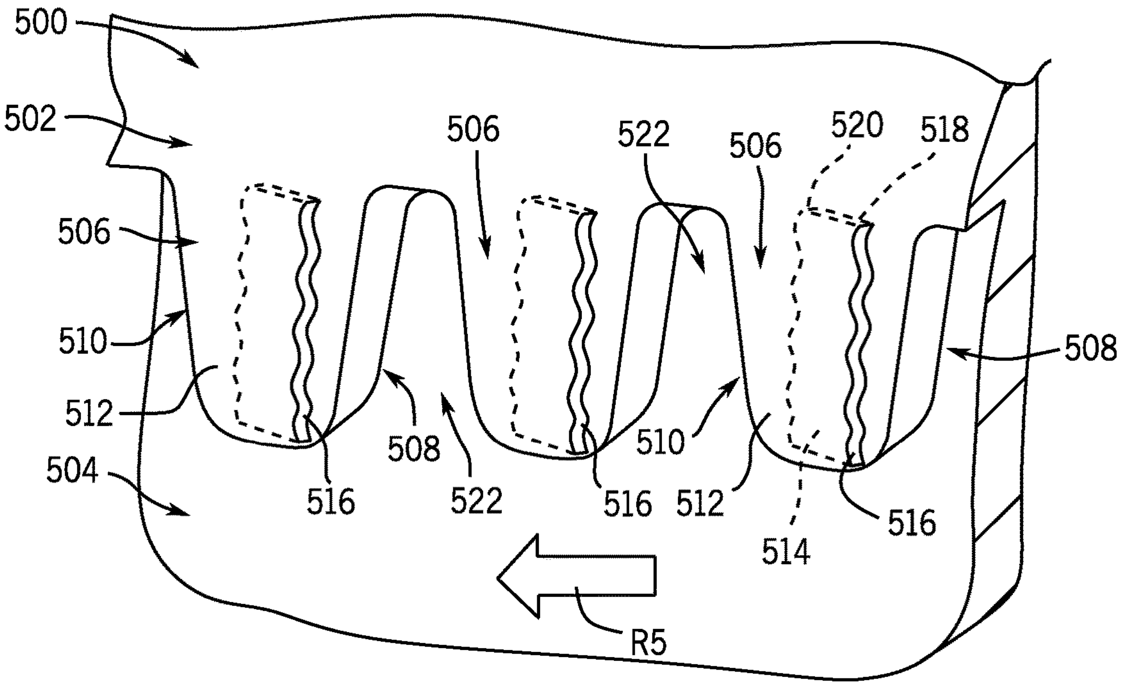
FIG. 13 is a view of a portion of a fifth example of a grinding section of a food waste disposer of the present technology having an internal wall that includes projections and grinding inserts.

FIGS. 12 and 13 illustrate portions of a fourth and fifth example of grinding sections of the present technology, each of which has grinding inserts placed at an angle within the projections. In such examples, the grinding inserts may be flat, corrugated, or have another suitable geometry. The grinding inserts may be oriented to achieve a rake angle with respect to the direction of rotation of the rotating grinding plate. In this angled orientation, the outer edge of each grinding insert may terminate at one end at or near the leading edge (e.g., the first edge) of the projection.

Such an orientation may maximize the strength of the grinding insert against bending due to the grinding action during operation of the food waste disposer, while still anchoring the grinding insert within the projection.

As discussed with respect to the example shown in FIGS. 10 and 11, the grinding inserts may protrude from the projections by a projection length, or may have an outer edge that is flush with the front edge of the projection. Additionally, the manufacturing process may result in the outer edge being enclosed by a layer of sacrificial plastic. In such an example, since the outer edge of the grinding insert would terminate at or near the leading edge of the projection, the extent of any sacrificial plastic that might be required may be minimized.

Referring to FIG. 12, grinding section 400 may have a rotating grinding plate 112 (FIG. 3), which may rotate in the direction shown by arrow R4. The grinding section 400 has an internal wall 402 that defines a food receiving area 404. The internal wall 402 has a plurality of projections 406 that are each formed in the internal wall 402 and face into the food receiving area 404. Each of the projections may be made of the same material as the rest of the internal wall 402, such as plastic.

As shown, the projections 406 collectively form a series of teeth. The internal wall 402 may form a circle, the circumference of which may define and enclose the food receiving area 404. The projections 406 may be formed in a repeating pattern, such as at spaced intervals, around the circumference of the internal wall. The projections 406 may be formed by varying the thickness of the grinding section housing to form the projections in the same manner as described above with respect to FIG. 5.

Each of the projections 406 may be in the form of a tooth formed in the internal wall 402, facing into the food receiving area 404, and each projection 406 may be molded vertically, essentially vertically, curved, sloped, or biased at an angle. With respect to the direction of rotation R4, each projection 406 has a first edge 408 and a second edge 410, each of which may be a leading or trailing edge depending upon the direction of rotation R4. Each projection 406 also has a front edge 412, which faces into the food receiving area 404. The grinding section 400 also includes notches 422 formed in the internal wall 402 between the projections 406. The notches 422 form channels into which food particles may enter and fall downwardly into the food conveying section 124 (FIG. 3).

The grinding section 400 also includes a plurality of grinding inserts 414. Each grinding insert 414 is attached to one of the projections 406. Each grinding insert 414 may be made of any suitable metal or composite material, including without limitation steel. Each grinding insert 414 may be individually formed by being stamped, or by any other suitable forming technique. The grinding inserts 414 may be robotically placed from a feeding mechanism, and may be attached to the projections by being insert-molded. Each of the grinding inserts 414 may be attached to the projections in any suitable manner, and may be oriented vertically or biased at an angle.

In the example shown in FIG. 12, each grinding insert 414 is flat, but alternatively may be corrugated, or have any other suitable shape. Each grinding insert 414 may be inserted into a projection 406 such that the projection overlaps at least a portion of the grinding insert 414. Specifically, in this example, the grinding insert 414 may be configured to be radially-oriented and be inserted into the projection 406 such that at least a portion of the grinding insert 414 is encompassed by and secured within the projection 406. In some examples, each projection 406 may be formed with an engagement feature, such as a slot or hole, configured to receive at least a portion of the grinding insert 414 to the projection 406.

Each grinding insert 414 may be oriented at an angle with respect to the first edge 408 of the projection 406 to which it is attached. Each grinding insert 414 may have an outer edge 416, and may also have a first end 418 and a second end 420. The first end 418 of the grinding insert may be located at the first edge 408 of the projection 406, and may be flush with or protrude from the first edge 408 of the projection 406. The angled orientation of the grinding insert 414 may result in the second end 420 being located farther from the first edge 408 of the projection than the first end 418.

Referring to FIG. 13, grinding section 500 may have a rotating grinding plate 112 (FIG. 3), which may rotate in the direction shown by arrow R5. The grinding section 500 has an internal wall 502 that defines a food receiving area 504. The internal wall 502 has a plurality of projections 506 that are each formed in the internal wall 502 and face into the food receiving area 504. Each of the projections may be made of the same material as the rest of the internal wall 502, such as plastic.

As shown, the projections 506 collectively form a series of teeth. The internal wall 502 may form a circle, the circumference of which may define and enclose the food receiving area 504. The projections 506 may be formed in a repeating pattern, such as at spaced intervals, around the circumference of the internal wall. The projections 506 may be formed by varying the thickness of the grinding section housing to form the projections in the same manner as described above with respect to FIG. 5.

Each of the projections 506 may be in the form of a tooth formed in the internal wall 502, facing into the food receiving area 504, and each projection 506 may be molded vertically, essentially vertically, curved, sloped, or biased at an angle. With respect to the direction of rotation R5, each projection 506 has a first edge 508 and a second edge 510, each of which may be a leading or trailing edge depending upon the direction of rotation R5. Each projection 506 also has a front edge 512, which faces into the food receiving area 504. The grinding section 500 also includes notches 522 formed in the internal wall 502 between the projections 506. The notches 522 form channels into which food particles may enter and fall downwardly into the food conveying section 124 (FIG. 3).

The grinding section 500 also includes a plurality of grinding inserts 514. Each grinding insert 514 is attached to one of the projections 506. Each grinding insert 514 may be made of any suitable metal or composite material, including without limitation steel. Each grinding insert 514 may be individually formed by being stamped, or by any other suitable forming technique. The grinding inserts 514 may be robotically placed from a feeding mechanism, and may be attached to the projections by being insert-molded. Each of the grinding inserts 514 may be attached to the projections in any suitable manner, and may be oriented vertically or biased at an angle.

In the example shown in FIG. 13, each grinding insert 514 is corrugated, but alternatively may be flat, or have any other suitable shape. Each grinding insert 514 may be inserted into a projection 506 such that the projection overlaps at least a portion of the grinding insert 514. Specifically, in this example, the grinding insert 514 may be configured to be inserted into the projection 506 such that at least a portion of the grinding insert 514 is encompassed by and secured within the projection 506. In some examples, each projection 506 may be formed with an engagement feature, such as a slot or hole, configured to receive at least a portion of the grinding insert 514 to the projection 506.

Each grinding insert 514 may be oriented at an angle with respect to the first edge 508 of the projection 506 to which it is attached. Each grinding insert 514 may have an outer edge 516, and may also have a first end 518 and a second end 520. The first end 518 of the grinding insert may be located at the first edge 508 of the projection 506, and may be flush with or protrude from the first edge 508 of the projection 506. The angled orientation of the grinding insert 514 may result in the second end 520 being located farther from the first edge 508 of the projection than the first end 518.

In accordance with the discussion above, food waste disposers, grinding sections for food waste disposers, and methods of making grinding sections for food waste disposers are provided.

In at least one example, a food waste disposer having a grinding section, or a grinding section of or for a food waste disposer, is provided. The grinding section may include a grinding section housing having an internal wall that defines a food receiving area, a plurality of projections formed in the internal wall and facing into the food receiving area, and a plurality of grinding inserts, wherein each grinding insert is attached to one of the projections. The plurality of projections may be formed in a repeating pattern around a circumference of the internal wall. Additionally, each of the plurality of projections may have a first edge, and each grinding insert may be attached to the first edge of one of the projections. Each grinding insert may be inserted into a projection such that the projection overlaps at least a portion of the grinding insert.

Each grinding insert may be shaped in any of a variety of ways. For example, each grinding insert may be flat, such as being formed as a flat rectangle. Alternatively, each grinding insert may be "L" shaped, having a first leg and a second leg, wherein the first leg is configured to be radially-oriented and be inserted into the projection. As another example, each grinding insert may be corrugated, having a wavy or curved shape.

The grinding inserts may be inserted into the projections in any suitable manner. For example, each grinding insert may be inserted such that it abuts or protrudes from a front edge or a leading edge of the projection. Each grinding insert may have an outer edge that protrudes into the food receiving area when the insert is inserted in the projection. Each grinding insert may be inserted vertically, or substantially vertically, or at an angle. In at least one example, each grinding insert may have a first end and a second end, and each grinding insert may be attached to the projection at an angle wherein the first end of the grinding insert is located at a first edge of the projection.

In an example of a method of manufacturing a grinding section for a food waste disposer, the method may include: molding a grinding section housing internal wall that defines a food receiving area and includes a plurality of projections formed in the internal wall and facing into the food receiving area; providing a plurality of grinding inserts; and attaching each of the plurality of grinding inserts to one of the projections. The step of providing a plurality of grinding inserts may include feeding each of the plurality of pieces to a robot. The step of attaching each of the plurality of grinding inserts may include insert molding each grinding insert into one of the projections. The step of molding the grinding section housing may further include creating a slot in each of the plurality of projections. The step of attaching each of the plurality of grinding inserts may include inserting one of the grinding inserts into each slot.

From the foregoing, it will be appreciated that although specific examples have been described herein for purposes of illustration, various modifications may be made without deviating from the spirit or scope of this disclosure. For example, there are multiple ways in which a robot could attach the inserts to the projections, including: indirectly, by placing the inserts into tooling which is then used in the process of molding the housing and its projections around the inserts; directly, by inserting one of the grinding inserts into a slot in each projection; or indirectly, by placing the inserts into fixture tooling which is then inserted into a slotted or otherwise prepared housing that has projection features capable of engaging them without a molding process. Additionally, the inserts can be attached to the projections using any suitable technique, such as: a snap-lock, staking, sonic welding, adhesive, or an overmold. An overmold could constitute an additional layer axially below and/or radially inside the projections, or could form some or all of the projections themselves, within a pre-existing molded housing, that would retain the inserted inserts and perhaps also fill any remaining voids in the insert slots. Further, depending upon the dimensions of the inserts and the projections, one or more edges of each insert may be inserted into the projection and/or the internal wall of the grinding housing. Additionally, each projection could be formed with a second horizontal step above the third thickness, to extend an axial length of a portion of the projection to receive and anchor a portion of the insert. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A grinding section for a food waste disposer, the grinding section comprising:
- a grinding section housing having an internal wall that defines a food receiving area;
- a plurality of projections formed in the internal wall and facing into the food receiving area;
- a plurality of grinding inserts, wherein each grinding insert is attached to one of the projections and has an outer edge that protrudes into the food receiving area.

2. The grinding section of claim 1, wherein the plurality of projections are formed in a repeating pattern around a circumference of the internal wall.

3. The grinding section of claim 1, wherein each of the plurality of projections has a first edge, and each grinding insert is attached to the first edge of one of the projections.

4. The grinding section of claim 1, wherein each grinding insert is inserted into the projection such that the projection overlaps at least a portion of the grinding insert.

5. The grinding section of claim 1, wherein each grinding insert is flat.

6. The grinding section of claim 1, wherein each grinding insert has a first leg and a second leg, wherein the first leg is configured to be radially-oriented and be inserted into the projection.

7. The grinding section of claim 1, wherein each grinding insert is corrugated.

8. The grinding section of claim 1, wherein each grinding insert has a first end and a second end, and each grinding insert is attached to the projection at an angle wherein the first end of the grinding insert is located at a first edge of the projection.

9. A food waste disposer comprising:
- a grinding section having a grinding section housing, the grinding section housing having an internal wall that defines a food receiving area;
- a plurality of projections formed in the internal wall and facing into the food receiving area;
- a plurality of grinding inserts, wherein each grinding insert is attached to one of the projections and has an outer edge that protrudes into the food receiving area.

10. The food waste disposer of claim 9, wherein the plurality of projections are formed in a repeating pattern around a circumference of the internal wall.

11. The food waste disposer of claim 9, wherein each of the plurality of projections has a first edge, and each grinding insert is attached to the first edge of one of the projections.

12. The food waste disposer of claim 9, wherein each grinding insert is inserted into the projection such that the projection overlaps at least a portion of the grinding insert.

13. The food waste disposer of claim 9, wherein each grinding insert has a first end and a second end, and each grinding insert is attached to the projection at an angle wherein the first end of the grinding insert is located at a first edge of the projection.

14. The grinding section of claim 1, wherein the plurality of projections are formed by varying the thickness of the grinding section housing, such that the grinding section housing has a first thickness above each projection, a second thickness at each projection, and a third thickness below each projection, and the second thickness is wider than the first thickness.

15. The food waste disposer of claim 9, wherein the plurality of projections are formed by varying the thickness of the grinding section housing, such that the grinding section housing has a first thickness above each projection, a second thickness at each projection, and a third thickness below each projection, and the second thickness is wider than the first thickness.

* * * * *